(12) United States Patent
Ikushima

(10) Patent No.: US 12,325,045 B2
(45) Date of Patent: Jun. 10, 2025

(54) PLANAR LAYERED MATERIAL MANUFACTURING METHOD AND APPARATUS

(71) Applicant: MUSASHI ENGINEERING, INC., Mitaka (JP)

(72) Inventor: Kazumasa Ikushima, Mitaka (JP)

(73) Assignee: MUSASHI ENGINEERING, INC., Mitaka (JP)

( * ) Notice: Subject to any disclaimer, the term of this patent is extended or adjusted under 35 U.S.C. 154(b) by 599 days.

(21) Appl. No.: 17/604,256

(22) PCT Filed: Apr. 24, 2020

(86) PCT No.: PCT/JP2020/017748
§ 371 (c)(1),
(2) Date: Oct. 15, 2021

(87) PCT Pub. No.: WO2020/222303
PCT Pub. Date: Nov. 5, 2020

(65) Prior Publication Data
US 2022/0203400 A1 Jun. 30, 2022

(30) Foreign Application Priority Data
Apr. 27, 2019 (JP) .................................. 2019/086925

(51) Int. Cl.
*B05D 1/36* (2006.01)
*B05D 3/06* (2006.01)
(Continued)

(52) U.S. Cl.
CPC ............... *B05D 1/36* (2013.01); *B05D 3/067* (2013.01); *B29C 66/95* (2013.01); *G02F 1/1303* (2013.01); *G02F 1/1341* (2013.01)

(58) Field of Classification Search
CPC ........... B05D 1/36; B05D 5/10; G02F 1/1341; G02F 1/13415; G02F 2202/28; B29C 66/95
USPC ......................................................... 156/64
See application file for complete search history.

(56) References Cited

U.S. PATENT DOCUMENTS

| | | |
|---|---|---|
| 2003/0231278 A1 | 12/2003 | Nam et al. |
| 2005/0206833 A1 | 9/2005 | Name et al. |
| 2008/0153377 A1 | 6/2008 | Kobayashi et al. |

FOREIGN PATENT DOCUMENTS

| | | |
|---|---|---|
| CN | 101211049 A | 7/2008 |
| EP | 2 711 088 A1 | 3/2014 |

(Continued)

OTHER PUBLICATIONS

Machine translation of JP 2015-193004 date unknown.*
(Continued)

*Primary Examiner* — John L Goff, II
(74) *Attorney, Agent, or Firm* — WHDA, LLP

(57) ABSTRACT

Continuously manufacturing a planar layered material by repeatedly performing a bank portion forming step of supplying a first liquid material to a first workpiece and forming a bank portion in a frame shape, filled portion forming step of supplying a second liquid material to an inner side of the formed bank portion and forming a filled portion, and a bonding step of bonding the first workpiece with the filled portion formed thereon and a second workpiece to each other, the planar layered material manufacturing method comprises a height measurement step of measuring, by a height measurement device, a height of the filled portion or the bank portion formed on the first workpiece, and a height adjustment step of adjusting a relative height between the filled portion and the bank portion on the basis of the height of the filled portion or the bank portion measured in the height measurement step.

27 Claims, 13 Drawing Sheets

(51) Int. Cl.
*B29C 65/00* (2006.01)
*G02F 1/13* (2006.01)
*G02F 1/1341* (2006.01)

(56) References Cited

FOREIGN PATENT DOCUMENTS

| | | | |
|---|---|---|---|
| JP | 2002370057 A | * | 12/2002 |
| JP | 2003-33708 A | | 2/2003 |
| JP | 2003-161925 A | | 6/2003 |
| JP | 2004-21260 A | | 1/2004 |
| JP | 2007-52312 A | | 3/2007 |
| JP | 5702223 B2 | | 4/2015 |
| JP | 2015-193004 A | | 11/2015 |

OTHER PUBLICATIONS

Machine translation of JP 2007-52312 date unknown.*
Machine translation of JP 2002-370057 date unknown.*
Office Action dated May 26, 2023, issued in counterpart CN Application No. 202080031757.0, with English translation. (11 pages).
International Search Report dated Jun. 23, 2020, issued in counterpart International Application No. PCT/JP2020/017748. (2 pages).
Chunyu j. et al., Principles of Structure and Maintenance for Modern Automotive Electronic Devices, 1st edition, Beijing Institute of Technology Press, p. 174-175, Dec. 2014, with English translation; cited in CN Office Action dated Feb. 3, 2024. (9 pages).
Office Action dated Feb. 3, 2024, issued in counterpart CN Application No. 202080031757.0, with English translation. (10 pages).

* cited by examiner

[Fig.1]
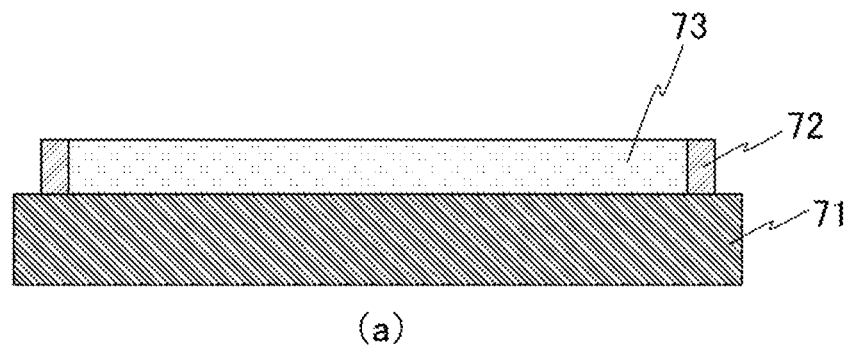
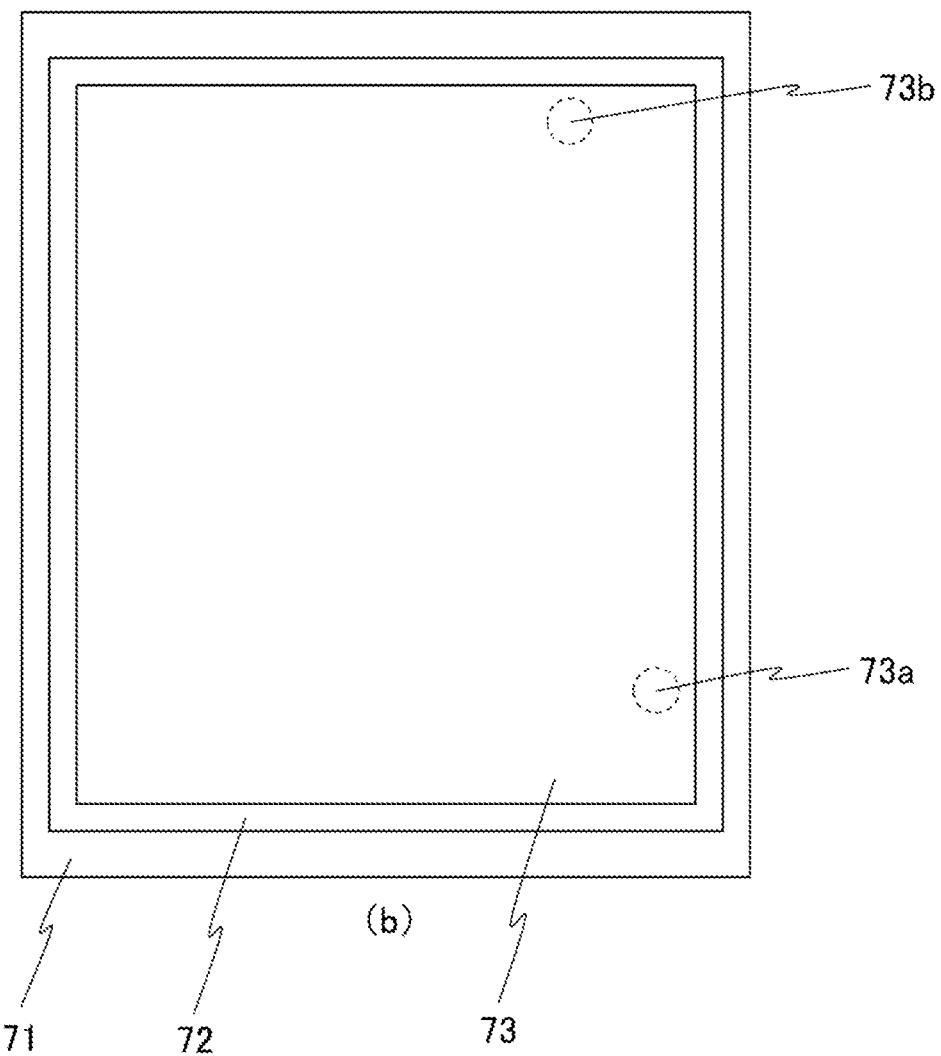

[Fig.2]
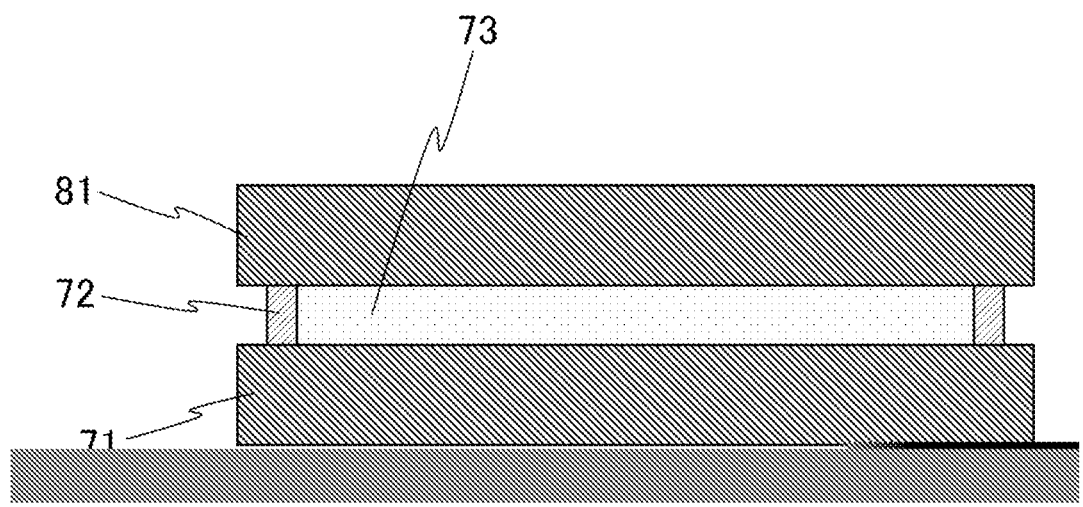

[Fig.3]
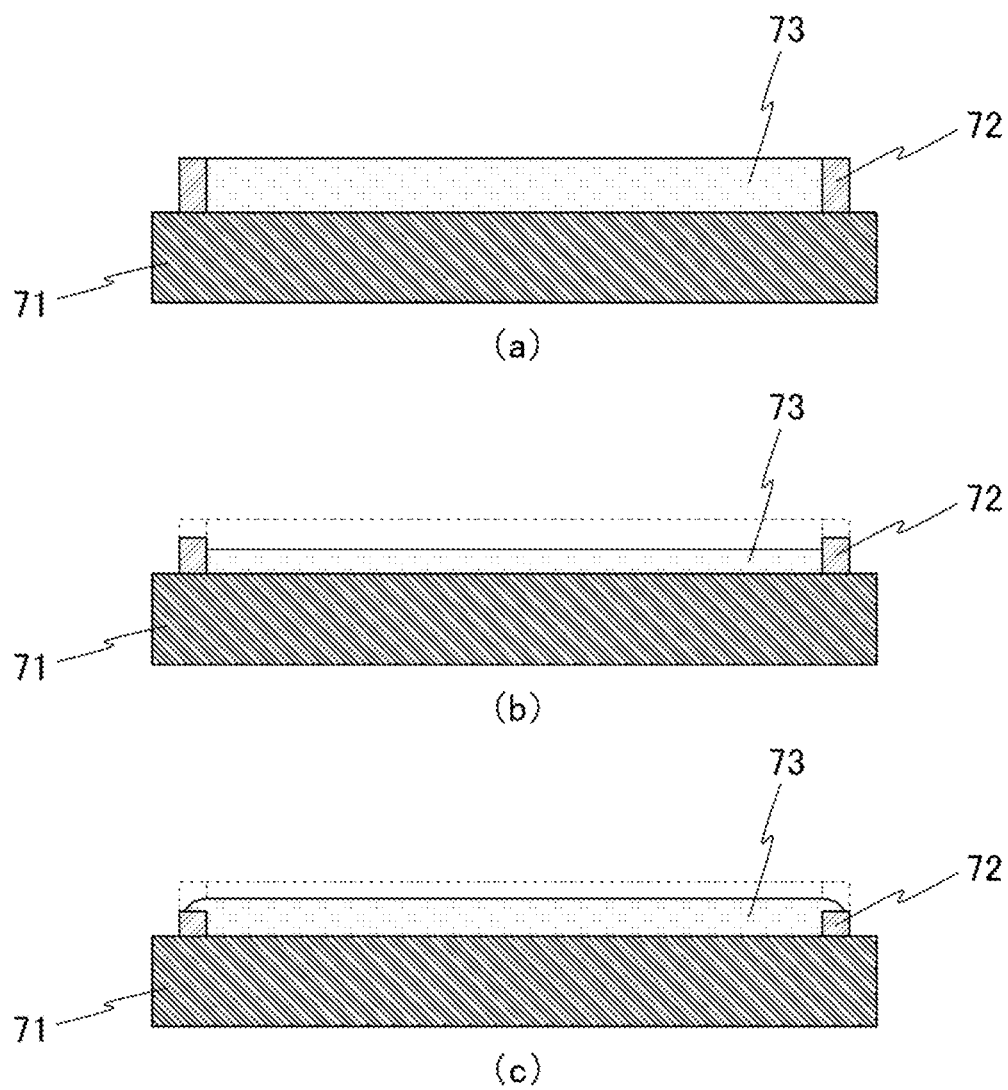

[Fig.4]
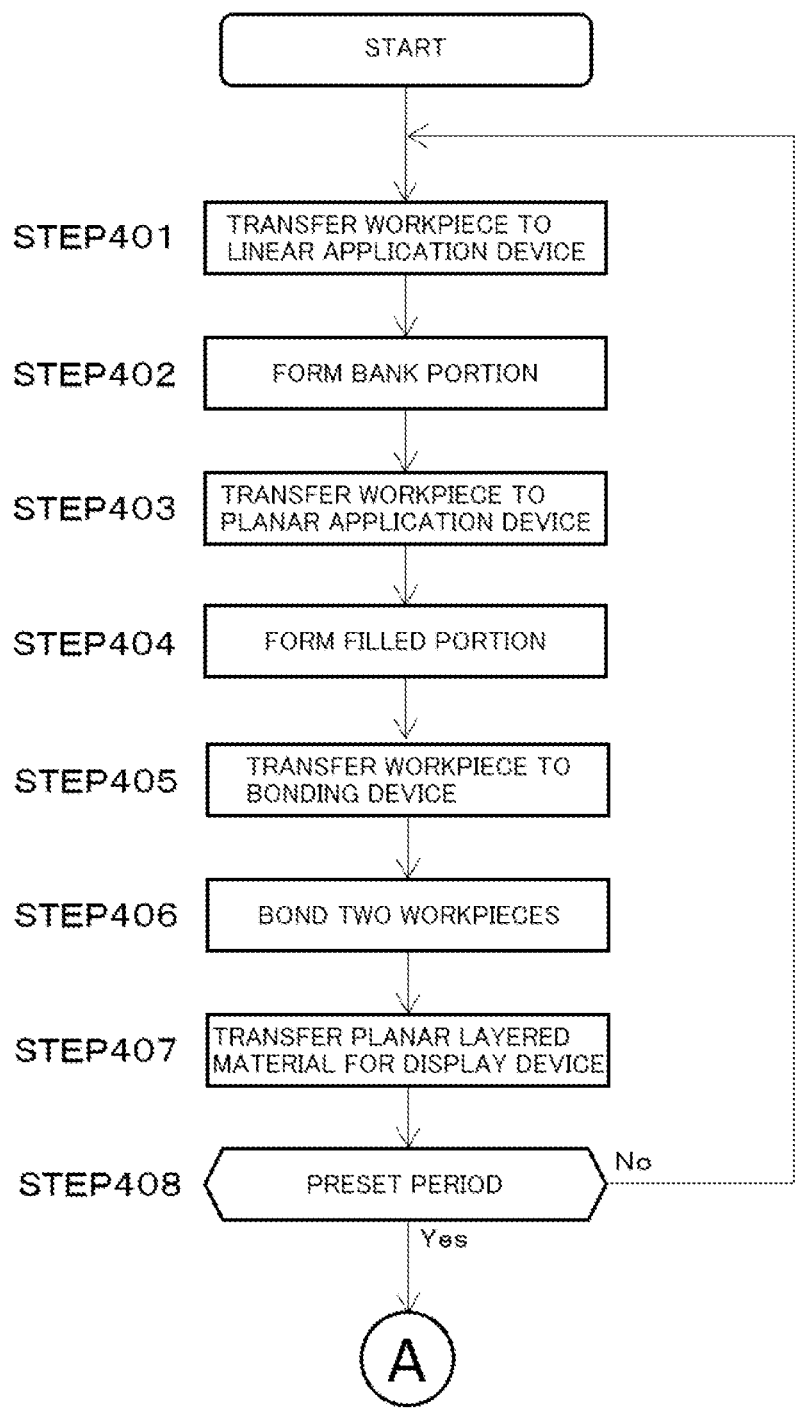

[Fig. 5]
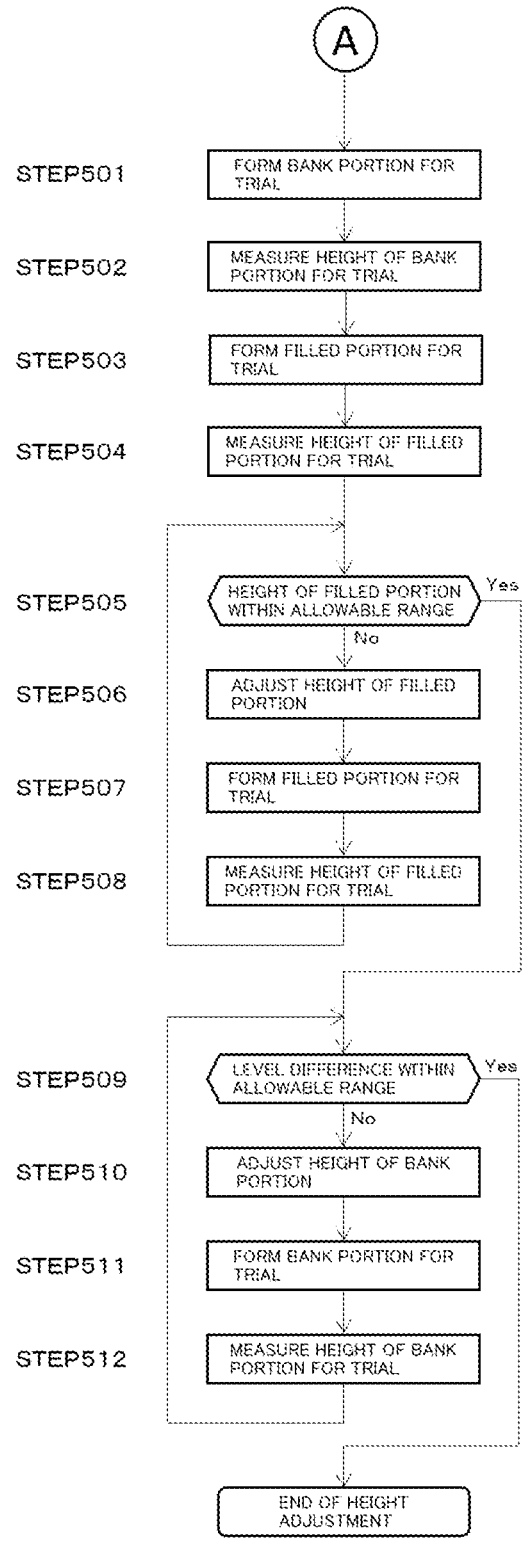

[Fig.6]
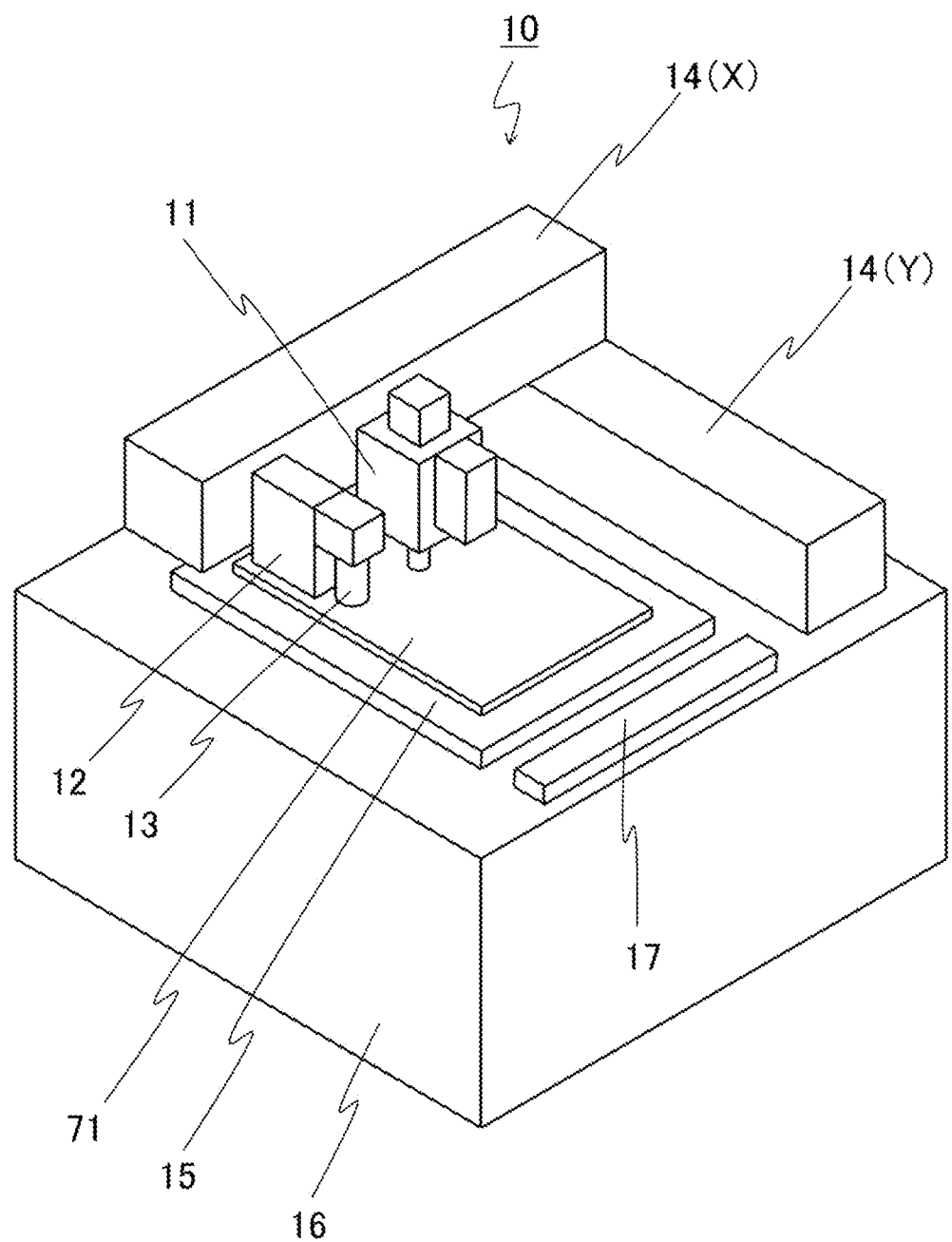

[Fig.7]
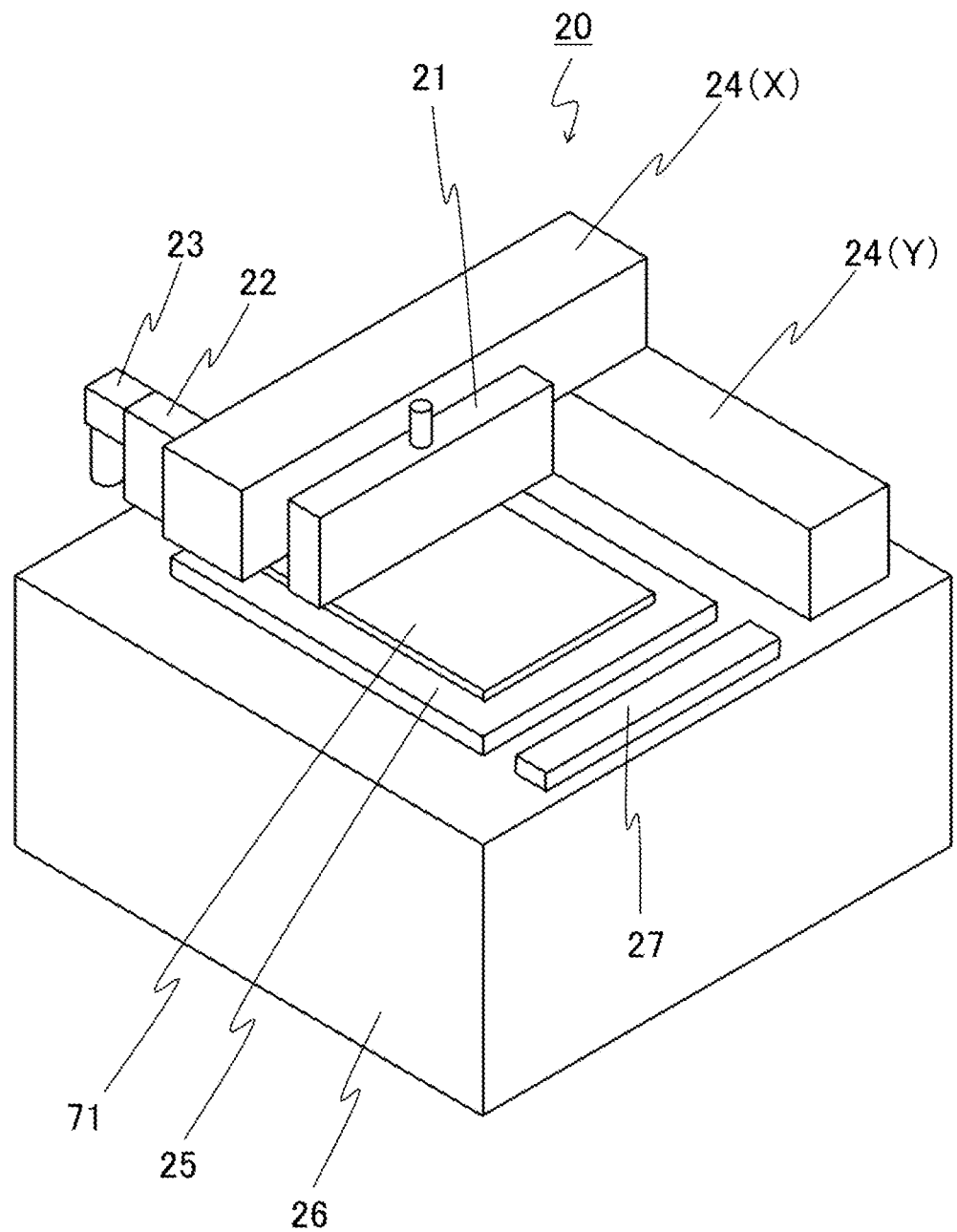

[Fig.8]
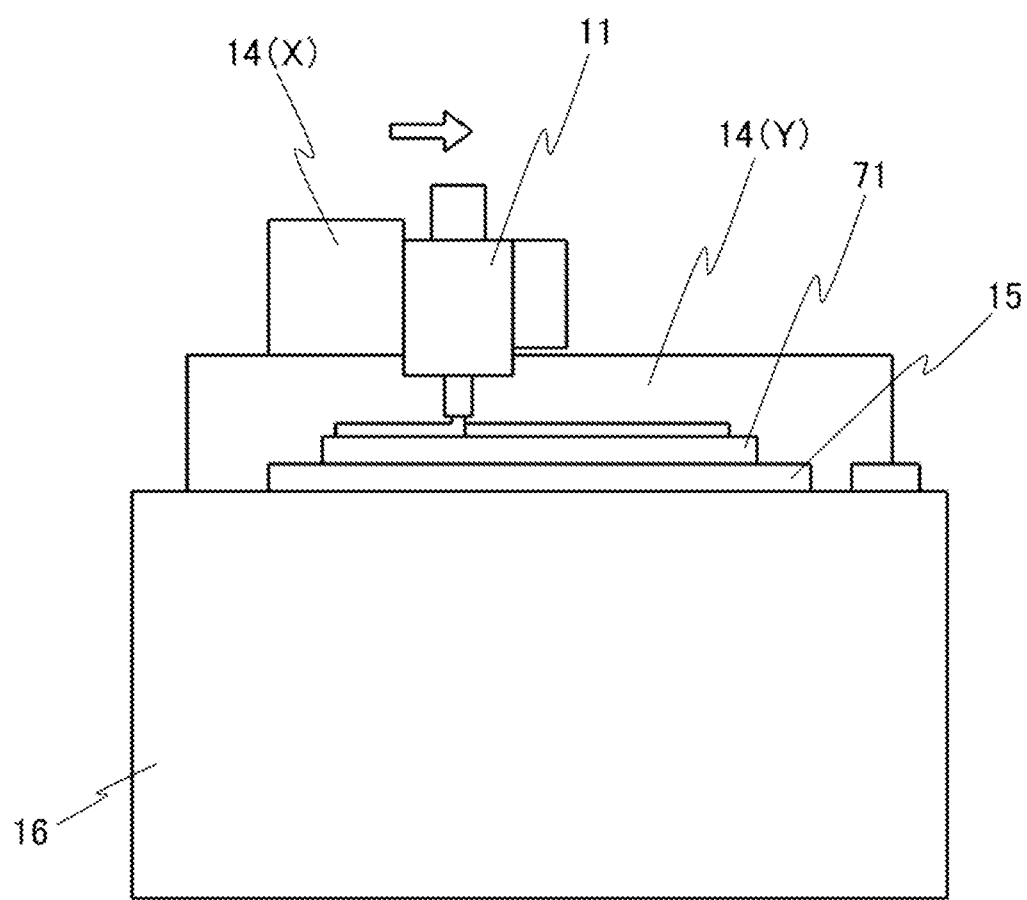

[Fig.9]
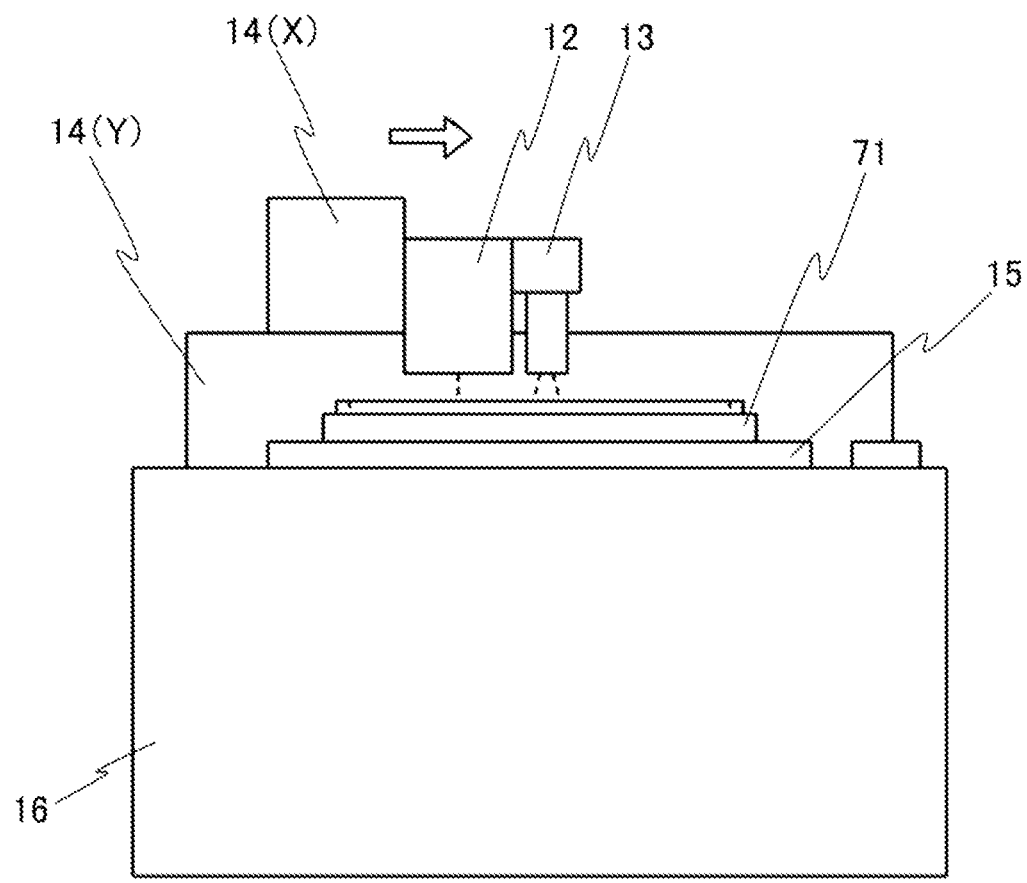

[Fig.10]
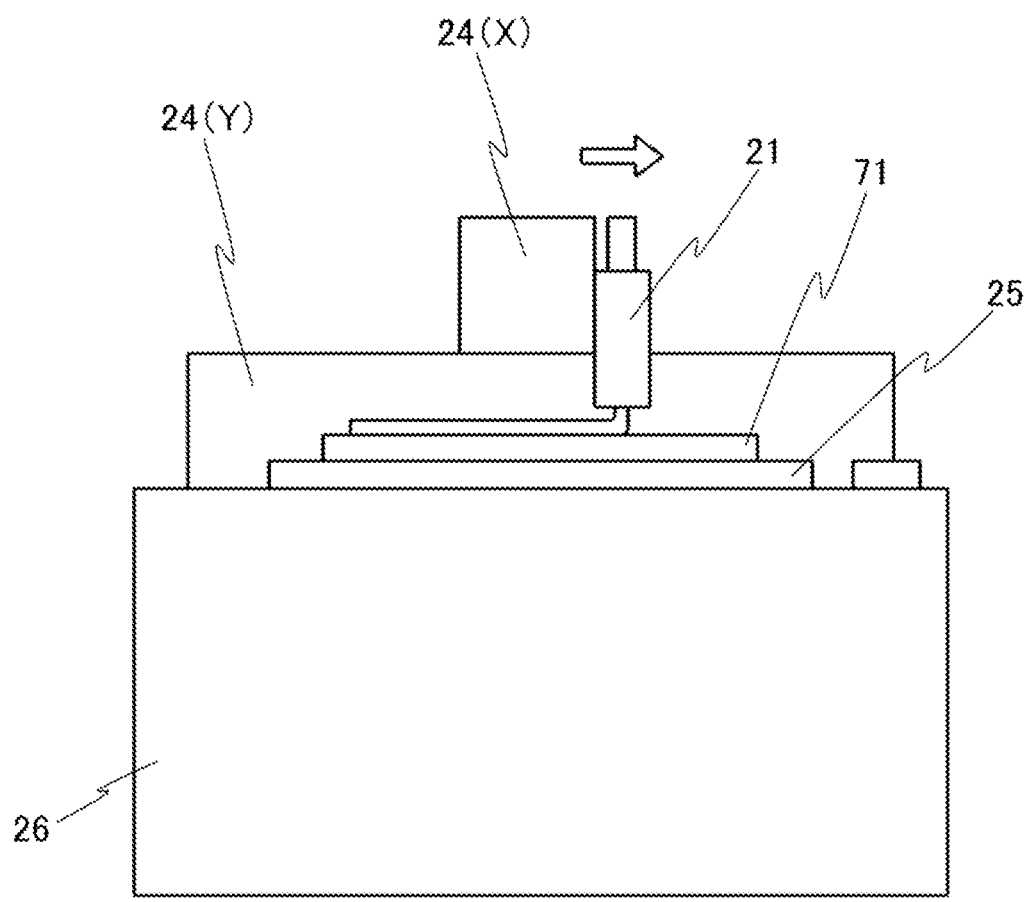

[Fig.11]
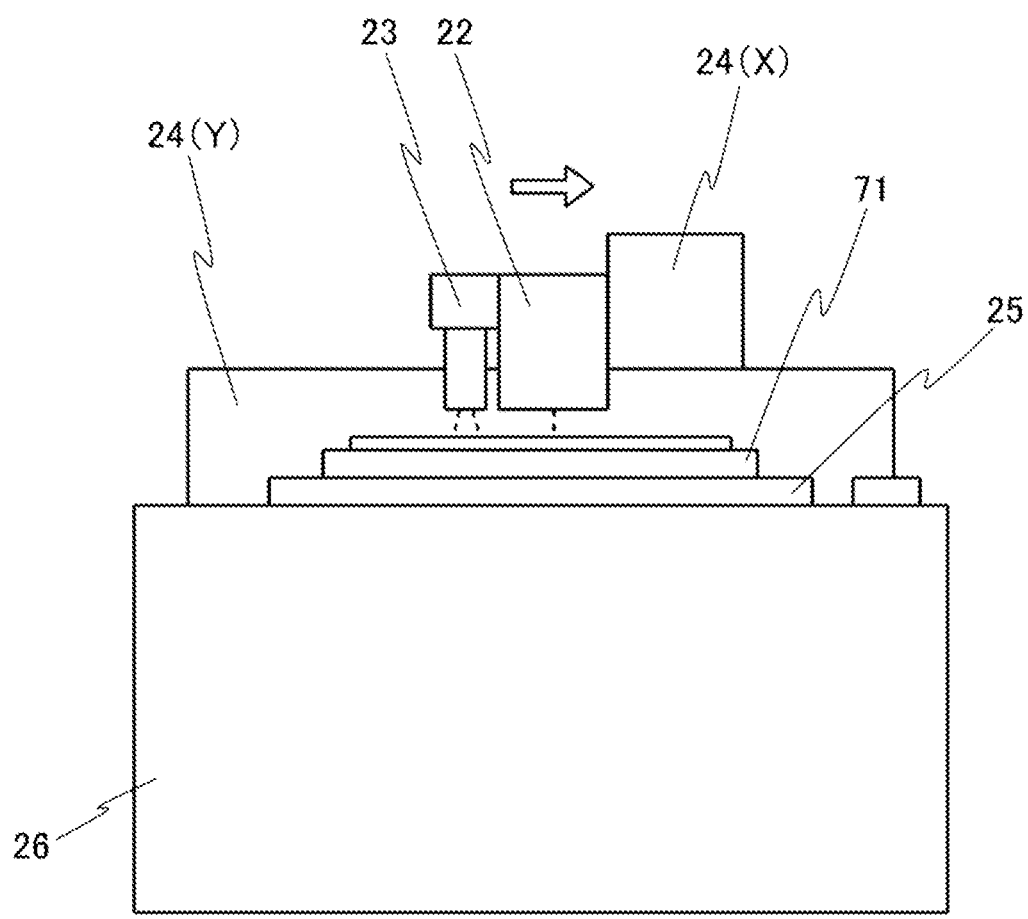

[Fig.12]
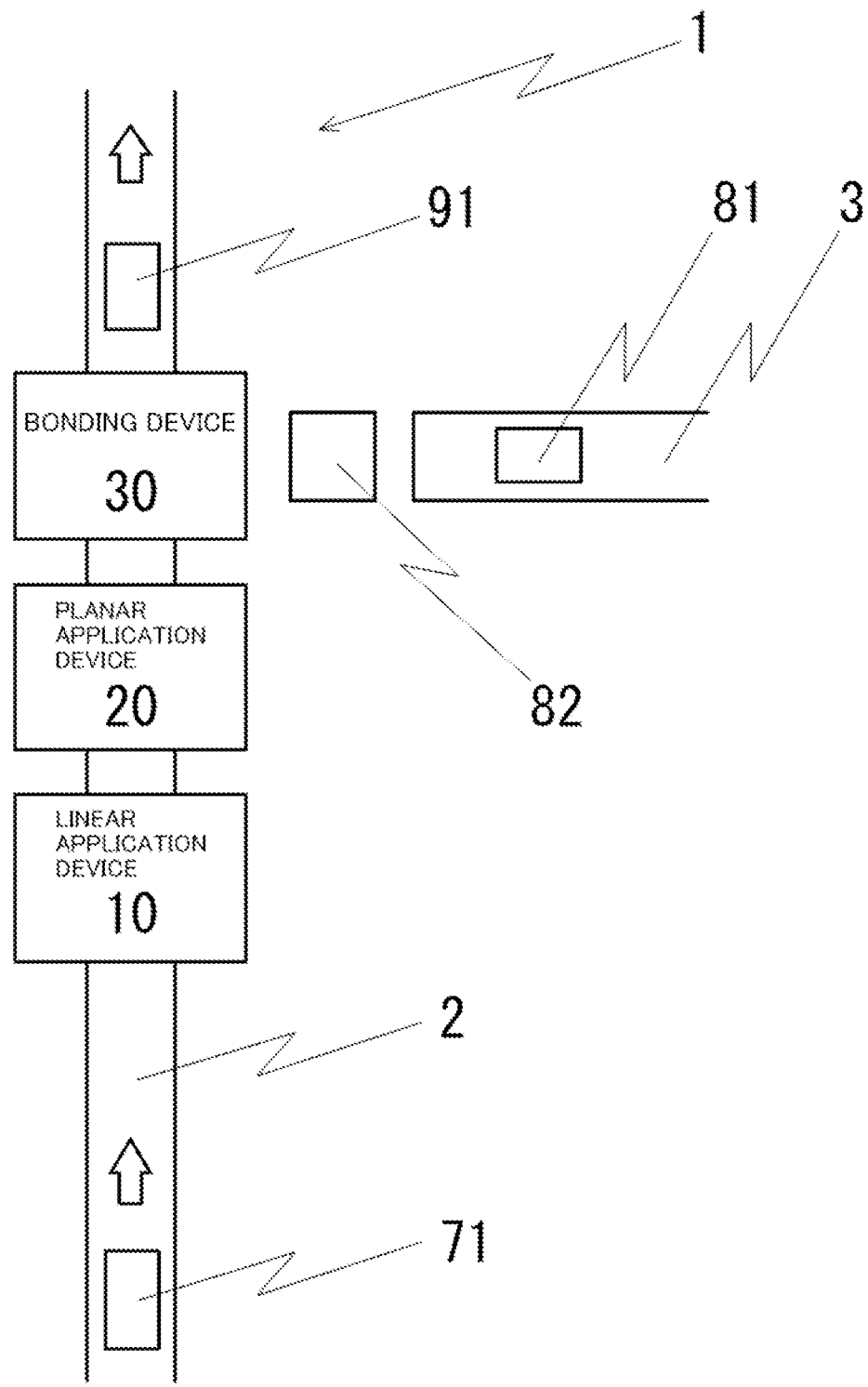

[Fig.13]
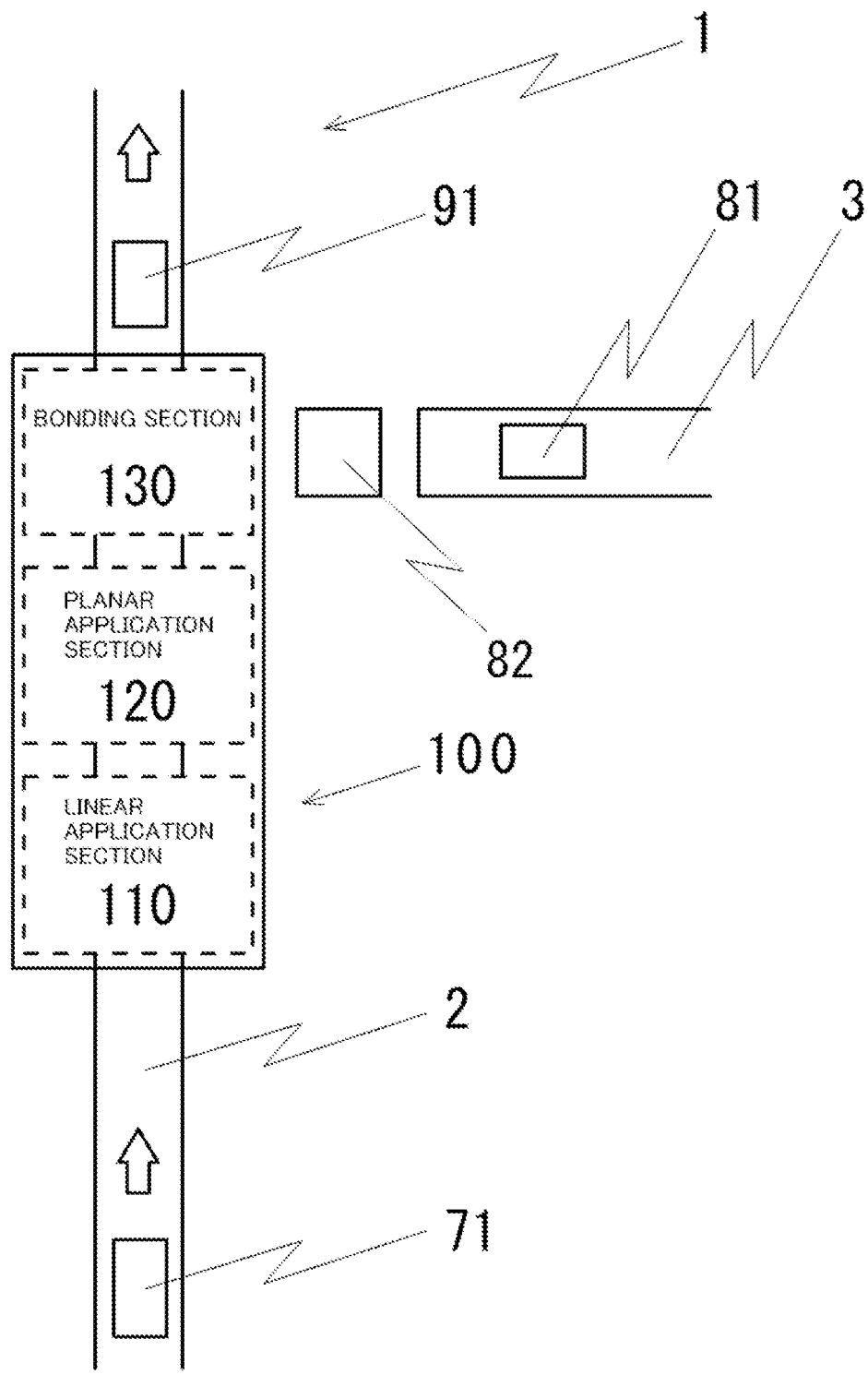

PLANAR LAYERED MATERIAL MANUFACTURING METHOD AND APPARATUS

TECHNICAL FIELD

The present invention relates to a method and an apparatus for manufacturing a planar layered material by bonding an upper workpiece and a lower workpiece on which a bonding layer (joining layer) constituted by a bank portion and a filled portion is formed. More particularly, the present invention relates to a planar layered material manufacturing method and apparatus for use in manufacturing, for example, a display device such as a liquid crystal display.

BACKGROUND ART

Hitherto, a liquid crystal display has been constituted by stacking a liquid crystal module, an operating touch panel, a protective panel (cover panel) for protecting the surface, and so on, and by assembling a layered unit into a casing. In stacking the touch panel or the cover panel and the liquid crystal module, an adhesive is supplied to one or both of a pair of workpieces to be stacked, and the workpieces are then bonded to each other. Typically, the workpieces are bonded to each other by forming a frame (bank portion) in a rectangular shape on a surface of one of the workpieces with a dam material, filling a fill material to a region surrounded by the bank portion to form a filled portion, and then by placing the other workpiece on the surface of the one workpiece on which the bank portion and the filled portion are formed. For example, Patent Document 1 discloses a technique of, by using an apparatus including a supply unit that supplies an adhesive R1 to one of workpieces to be bonded to each other along a workpiece edge and forms a bank portion B, and a curing unit that performs a process of promoting curing of the adhesive R1, bonding the workpieces to each other by a bonding unit after filling, by the supply unit, an adhesive R2 into the bank portion B formed in the one workpiece.

A slit nozzle formed with one elongate gap is used in many of apparatuses for applying a liquid material in the form of a film with a uniform thickness over a wide range of the surface of an application target, such as for applying a resist solution or the like in manufacturing of electric and electronic products, and for applying a phosphor paste in manufacturing of display devices. As the nozzle for applying the liquid material to form the film, there is known, for example, a nozzle proposed by the applicant and disclosed in Patent Document 2.

CITATION LIST

Patent Documents

Patent Document 1: Japanese Patent Laid-Open Publication No. 2015-193004
Patent Document 2: Japanese Patent No. 5702223

SUMMARY OF INVENTION

Technical Problem

In the case of manufacturing a planar layered material by forming the bank portion (dam material) and the filled portion (fill material) with different adhesives, because a rise of liquid viscosity (cure degree) over time is different between both the portions, there is a problem of causing, with the lapse of manufacturing time, a difference in height between the bank portion and the filled portion on the planar layered material to be manufactured. In other words, a problem arises in that the filled portion becomes higher than the bank portion beyond an allowable range, or that the bank portion becomes higher than the filled portion beyond an allowable range. If the difference in height (level difference) between the bank portion and the filled portion exceeds a certain value, another problem arises in that bubbles are formed in a step portion defined by the level difference when the planar layered material is manufactured by bonding the upper and lower workpieces to each other.

In consideration of the above-described situations, an object of the present invention is to provide a planar layered material manufacturing method and apparatus that can minimize a difference in height between a bank portion and a filled portion, the difference occurring over time.

Solution to Problem

The present invention provides a planar layered material manufacturing method for continuously manufacturing a planar layered material by repeatedly performing a bank portion forming step of supplying a first liquid material to a first workpiece from a first nozzle and forming a bank portion in a frame shape, a filled portion forming step of supplying a second liquid material to an inner side of the formed bank portion from a second nozzle and forming a filled portion, and a bonding step of bonding the first workpiece including the filled portion formed thereon and a second workpiece to each other, the planar layered material manufacturing method comprising a height measurement step of measuring, by a height measurement device, a height of the filled portion or the bank portion formed on the first workpiece, and a height adjustment step of adjusting a relative height between the filled portion and the bank portion on the basis of the height of the filled portion or the bank portion measured in the height measurement step.

In the above-described planar layered material manufacturing method, when the height of the bank portion is measured in the height measurement step, at least the height of the filled portion may be adjusted in the height adjustment step, and when the height of the filled portion is measured in the height measurement step, at least the height of the bank portion may be adjusted in the height adjustment step.

In the above-described planar layered material manufacturing method, the height of the bank portion to be formed in the bank portion forming step or the height of the filled portion to be formed in the filled portion forming step may be adjusted in the height adjustment step on the basis of the height of the filled portion or the bank portion measured in the height measurement step such that a relative difference between the height of the filled portion and the height of the bank portion falls within a preset range.

In the above-described planar layered material manufacturing method, linear application may be performed in the bank portion forming step, and the height of the bank portion to be formed in the bank portion forming step may be adjusted in the height adjustment step by adjusting a clearance between the first nozzle and the first workpiece.

In the above-described planar layered material manufacturing method, the height of the bank portion to be formed in the bank portion forming step may be adjusted in the height adjustment step while a supply amount of the first liquid material is kept constant.

In the above-described planar layered material manufacturing method, the height of the bank portion to be formed in the bank portion forming step may be adjusted in the height adjustment step by adjusting a supply amount of the first liquid material.

In the above-described planar layered material manufacturing method, the height of the bank portion to be formed in the bank portion forming step may be adjusted in the height adjustment step by adjusting a relative moving speed between the first nozzle and the first workpiece.

In the above-described planar layered material manufacturing method, the height of the bank portion to be formed in the bank portion forming step may be adjusted in the height adjustment step while a relative moving speed between the first nozzle and the first workpiece is kept constant.

In the above-described planar layered material manufacturing method, when the height of the filled portion measured in the height measurement step is outside an allowable range, the height of the filled portion to be formed in the filled portion forming step may be further adjusted in the height adjustment step.

In the above-described planar layered material manufacturing method, planar application may be performed in the filled portion forming step, and the height of the filled portion to be formed in the filled portion forming step may be adjusted in the height adjustment step by adjusting a clearance between the second nozzle and the first workpiece.

In the above-described planar layered material manufacturing method, the height of the filled portion to be formed in the filled portion forming step may be adjusted in the height adjustment step while a supply amount of the second liquid material is kept constant.

In the above-described planar layered material manufacturing method, the height of the filled portion to be formed in the filled portion forming step may be adjusted in the height adjustment step by adjusting a supply amount of the second liquid material.

In the above-described planar layered material manufacturing method, the height of the filled portion to be formed in the filled portion forming step may be adjusted in the height adjustment step by adjusting a relative moving speed between the second nozzle and the first workpiece.

In the above-described planar layered material manufacturing method, the height of the filled portion to be formed in the filled portion forming step may be adjusted in the height adjustment step while a relative moving speed between the second nozzle and the first workpiece is kept constant.

In the above-described planar layered material manufacturing method, the height of the filled portion formed on the first workpiece on which the filled portion forming step has been performed may be measured in the height measurement step.

In the above-described planar layered material manufacturing method, the height in an edge region along a side of the filled portion formed on the first workpiece may be measured in the height measurement step at plural locations by the height measurement device.

In the above-described planar layered material manufacturing method, the height of the bank portion formed on the first workpiece on which the bank portion forming step has been performed may be measured in the height measurement step.

In the above-described planar layered material manufacturing method, the height in a central region of a side or a corner region of the bank portion formed on the first workpiece may be measured in the height measurement step at plural locations by the height measurement device.

In the above-described planar layered material manufacturing method, the height of the filled portion or the bank portion formed on a trial discharge stage may be measured in the height measurement step.

In the above-described planar layered material manufacturing method, the height adjustment step may be executed per preset period.

In the above-described planar layered material manufacturing method, the planar layered material may be a planar layered material for a display device.

The present invention further provides a planar layered material manufacturing apparatus for executing the above-described planar layered material manufacturing method, the planar layered material manufacturing apparatus comprising a linear application device including a first discharge device to execute the bank portion forming step, a planar application device including a second discharge device to execute the filled portion forming step, a bonding device executing the bonding step, and a height measurement device executing the height adjustment step.

In the above-described planar layered material manufacturing apparatus, the height measurement device may be constituted by a first height measurement device included in the linear application device and a second height measurement device included in the planar application device, the linear application device and the planar application device may be able to communicate with each other via a network, and the linear application device may adjust the height of the bank portion in accordance with information about the height of the filled portion measured by the second height measurement device, the information being received from the planar application device.

In the above-described planar layered material manufacturing apparatus, the linear application device may have a bank raising adjustment function of adjusting the height of the bank portion to be raised in accordance with the information about the height of the filled portion, and a bank lowering adjustment function of adjusting the height of the bank portion to be lowered in accordance with the information about the height of the filled portion.

Advantageous Effect of Invention

According to the present invention, the planar layered material manufacturing method and apparatus can be provided which is able to minimize a difference in height between the bank portion and the filled portion, the difference occurring over time.

BRIEF DESCRIPTION OF THE DRAWINGS

FIG. 1 illustrates a first workpiece in an embodiment; specifically, FIGS. 1(a) and 1(b) are respectively a side view and a plan view.

FIG. 2 is a side view of a planar layered material for a display device, the planar layered material being constituted by stacking the first workpiece and a second workpiece in the embodiment.

FIG. 3 illustrates the first workpiece in the embodiment; specifically, FIG. 3(a) is a side view illustrating a state in which heights of a bank portion and a filled portion are the same, FIG. 3(b) is a side view illustrating a state in which the bank portion is higher than the filled portion, and FIG. 3(c) is a side view illustrating a state in which the filled portion is higher than the bank portion.

FIG. 4 is a flowchart of a method of manufacturing the planar layered material for the display device according to the embodiment.

FIG. 5 is a flowchart of a height adjustment step according to the embodiment.

FIG. 6 is a perspective view of a linear application apparatus according to the embodiment.

FIG. 7 is a perspective view of a planar application apparatus according to the embodiment.

FIG. 8 is an explanatory side view illustrating a linear application step according to the embodiment.

FIG. 9 is an explanatory side view illustrating a planar application step according to the embodiment.

FIG. 10 is an explanatory side view illustrating a linear application inspection step according to the embodiment.

FIG. 11 is an explanatory side view illustrating a planar application inspection step according to the embodiment.

FIG. 12 is a plan view of a manufacturing line of the planar layered material for the display device according to the embodiment.

FIG. 13 is a plan view of a manufacturing line of a planar layered material for the display device according to a modification of the embodiment.

DESCRIPTION OF EMBODIMENTS

A manufacturing line 1 and a manufacturing method of a planar layered material for a display device according to an embodiment will be described below with reference to the drawings. It is to be noted that the manufacturing method and apparatus according to the present invention can be applied to other fields as well without being limited to the planar layered material for the display device.

As illustrated in FIG. 12, the manufacturing line 1 of the planar layered material for the display device according to the embodiment is constituted by a linear application device 10, a planar application device 20, and a bonding device 30. The linear application device 10, the planar application device 20, and the bonding device 30 are connected by a first transfer device 2, and a first workpiece 71 is transferred between the above-mentioned devices by the first transfer device 2. A second transfer device 3 for transferring a second workpiece 81 is further connected to the bonding device 30. A robot hand 82 for moving the second workpiece 81 to the first transfer device 2 is disposed at a terminal end of the second transfer device 3. A robot hand for grasping the workpiece and moving it to a predetermined position may also disposed at each of a start end and a terminal end of the first transfer device (2).

<Linear Application Device 10>

As illustrated in FIG. 6, the linear application device 10 in the embodiment includes a first discharge device 11 for supplying a first liquid material (first adhesive), a first height measurement device 12, a first imaging device 13, a relative driving device 14, a worktable 15, a base 16, and a trial discharge stage 17.

The first discharge device 11 is a dispenser for carrying out linear application and may be constituted by a dispenser of screw type, needle type, plunger type, air type, or jet type. In the screw type dispenser, a screw is disposed in a liquid chamber in communication with a nozzle, and a liquid material is delivered to the nozzle with rotation of the screw to be discharged from the nozzle. In the needle type dispenser, a valve member (valve rod) is abutted against or departed from a valve seat equipped with an opening in communication with a discharge port, thereby closing and opening the discharge port to discharge the liquid material. In the plunger type dispenser, the liquid material is discharged from the discharge port with forward movement of a plunger that is liquid-tightly disposed in the liquid chamber. In the air type dispenser, pressurized air is supplied to the liquid material in the liquid chamber in communication with the nozzle, whereby the liquid material is discharged from the discharge port. In the jet type dispenser, a tip end of a plunger rod (valve member) positioned in the liquid chamber in communication with the nozzle and being narrower than the liquid chamber is moved forward and is then abruptly stopped to apply an inertial force to the liquid material, thereby discharging the liquid material.

A first adhesive (dam material) to form a bank portion 72 is supplied to a liquid chamber of the first discharge device 11 from a first storage container. The first storage container stores the first adhesive in an amount enough to perform linear application work on many workpieces. For example, a resin with low fluidity and high viscosity or an ultraviolet curable adhesive can be used as the first liquid material (first adhesive). The first liquid material (first adhesive) has the function of, after the first workpiece 71 and the second workpiece 81 have been bonded to each other, keeping relative positions of both the workpieces from being displaced. The types and amounts of components contained in the first liquid material, the occurrence or degree of curing, hardness after the curing, and so on can be selected depending on the intended use. The first discharge device 11 is mounted to the relative driving device 14 and forms the bank portion 72 by applying the first adhesive in a frame shape to function as a seal while the first discharge device 11 is relatively moved with respect to the workpiece. Here, the term "linear application" implies a process of applying the liquid material that is discharged from a discharge port of the first discharge device 11, and forming a thin drawing line on the workpiece with the liquid material. A line width of the bank portion 72 is, for example, 0.05 to 1.5 mm (preferably 1 mm or less).

The first height measurement device 12 is a device measuring an absolute height or a relative height of the bank portion 72 and can be constituted by, for example, a laser sensor, an ultrasonic sensor, or a contact sensor. The measurement by the first height measurement device 12 may be performed in accordance with suitable one of measurement methods based on a point, a line, and a plane. In measuring the height of the bank portion 72 by the first height measurement device 12, the measurement may be performed by scanning an entire surface of the bank portion 72, but the measurement is preferably performed at plural locations at least in central regions of sides or corner regions of the bank portion 72.

The first imaging device 13 is a CCD camera, for example, and it takes a surface image of the workpiece and transmits the taken image to a not-illustrated computer (administration terminal) connected via a later-described control device or network.

The relative driving device 14 is constituted by an X-axis drive device, a Y-axis drive device, and a Z-axis drive device (not illustrated). The first discharge device 11 is mounted to the X-axis drive device through the Z-axis drive device (not illustrated). The X-axis drive device can move the Z-axis drive device and the first discharge device 11 in an X-direction. The X-axis drive device is mounted to the Y-axis drive device and is moved in a Y-direction by the Y-axis drive device. The XYZ-axis drive devices can be each constituted by, for example, a combined mechanism of a ball screw and a motor, a mechanism using a linear motor, or a mechanism transmitting motive power through a belt or a chain. The relative driving device 14 is just required to be able to move the discharge device and the first workpiece relatively and is not limited to the mechanisms of the above-mentioned structures. In another example, the relative driving device 14 may be a device of a gate-type (gantry-type) structure.

The worktable 15 is a member in the form of a flat plate on which the first workpiece 71 is to be placed. The worktable 15 is equipped with a not-illustrated fixing mechanism (such as a suction mechanism or a clamping mechanism) to fixedly hold the first workpiece 71.

The control device (not illustrated) is disposed inside the base 16. The control device is a computer including a CPU and a memory device. The control device controls operations of the individual devices and installs therein a program for automatically executing a bank portion height adjustment step (STEP 509 to STEP 512) described later. The control device of the linear application device 10 can communicate with a control device of the planar application device 20 via the network to be able to receive height information of a filled portion 73 measured by a second height measurement device 22 and can execute control for adjusting the height of the bank portion 72 in accordance with the height information of the filled portion 73.

The trial discharge stage 17 provides a place where a bank portion for height adjustment is formed in executing the bank portion height adjustment step. A dummy substrate may be placed on the worktable 15 to perform a trial discharge without disposing the trial discharge stage 17. As an alternative, a replaceable workpiece for the trial discharge may be placed on the stage 17.

<Planar Application Device 20>

As illustrated in FIG. 7, the planar application device 20 in the embodiment includes a second discharge device 21 for supplying a second liquid material (second adhesive), a second height measurement device 22, a second imaging device 23, a relative driving device 24, a worktable 25, a base 26, and a trial discharge stage 27.

The second discharge device 21 is a dispenser for carrying out film-shape or planar application and may be constituted by an air type dispenser including a slit nozzle, which is disclosed in Patent Document 2, for example. In the disclosed air type dispenser, pressurized air is supplied to the liquid material in a liquid chamber in communication with the slit nozzle, whereby the liquid material is discharged from an elongate discharge port. The second discharge device 21 is not limited to the air type dispenser and may be constituted by a pump-driven dispenser in another example.

A second adhesive (fill material) to form the filled portion 73 is supplied to a liquid chamber of the second discharge device 21 from a second storage container. The second storage container stores the second adhesive in an amount enough to perform planar application work on many workpieces. The second liquid material (second adhesive) is an adhesive different from the first adhesive. For example, a resin with low fluidity and high viscosity or an ultraviolet curable adhesive can be used as the second liquid material (second adhesive). As with the first liquid material (first adhesive), the types and amounts of components contained in the second liquid material (second adhesive), the occurrence or degree of curing, hardness after the curing, and so on can be selected depending on the intended use. The second discharge device 21 is mounted to the relative driving device 24 and forms the filled portion 73 by filling the second adhesive to an inner side of the bank portion 72 while the second discharge device 21 is relatively moved with respect to the workpiece.

The second height measurement device 22 is a device measuring an absolute height or a relative height of the filled portion 73 and can be constituted by, for example, a laser sensor, an ultrasonic sensor, or a contact sensor. The measurement by the first height measurement device 12 may be performed in accordance with suitable one of measurement methods based on a point, a line, and a plane.

In measuring the height of the filled portion 73 by the second height measurement device 22, the measurement may be performed by scanning an entire surface of the filled portion 73, but the measurement is preferably performed at plural locations at least along edge regions of the filled portion 73 (namely, regions of the filled portion 73 located near the bank portion 72, for example, regions denoted by reference signs 73a and 73b). When the filled portion 73 is rectangular, it is preferable to perform the measurement at one or more locations (four or more locations in total) in the edge region along each of four sides of the filled portion 73, and further preferable to perform the measurement at plural locations (eight or more locations in total) in the edge region along each of the four sides of the filled portion 73. The reason is that the yield deteriorates if a difference between an actual height of the filled portion in the edge region and a specified value of the height of the filled portion is not within an allowable range (for example, ±5% of the specified value). The height of the filled portion 73 may be obtained by measuring heights of the filled portion 73 in regions located inner than the edge regions, and by executing statistical processing on the heights measured at the plural locations. The relative height of the filled portion 73 may be obtained by measuring the height of an upper surface of the first workpiece 71 and the height of an upper surface of the filled portion 73 after the application by the second discharge device 21.

The second imaging device 23 is a CCD camera, for example, and it takes a surface image of the workpiece and transmits the taken image to a not-illustrated computer (administration terminal) connected via a later-described control device or network.

The relative driving device 24 is constituted by an X-axis drive device, a Y-axis drive device, and a Z-axis drive device (not illustrated). The second discharge device 21 is mounted to the X-axis drive device through the Z-axis drive device (not illustrated). The X-axis drive device can move the Z-axis drive device and the second discharge device 21 in an X-direction. The X-axis drive device is mounted to the Y-axis drive device and is moved in a Y-direction by the Y-axis drive device. The XYZ-axis drive devices can be each constituted by, for example, a combined mechanism of a ball screw and a motor, a mechanism using a linear motor, or a mechanism transmitting motive power through a belt or a chain.

The worktable 25 is a member in the form of a flat plate on which the first workpiece 71 is to be placed. The worktable 25 is equipped with a not-illustrated fixing mechanism (such as a suction mechanism or a clamping mechanism) to fixedly hold the first workpiece 71.

The control device (not illustrated) is disposed inside the base 26. The control device is a computer including a CPU and a memory device. The control device controls operations of the individual devices and installs therein a program for automatically executing a filled portion height adjustment step (STEP 505 to STEP 508) described later. The control device of the planar application device 20 can communicate with the control device of the linear application device 10 via the network to be able to send, for example, a measurement result of the second height measurement device 22 to the control device of the linear application device 10.

The trial discharge stage 27 provides a place where a filled portion for height adjustment is formed in executing the filled portion height adjustment step. A dummy substrate may be placed on the worktable 25 to perform a trial discharge without disposing the trial discharge stage 27.

<Bonding Device 30>

The bonding device 30 is a known device such as disclosed in FIG. 2 of Patent Document 1. The bonding device 30 includes a decompression chamber and a pressure-reducing pump. After having been transferred into the decompression chamber, the first workpiece 71 including the bank portion 72 and the filled portion 73 formed thereon and the second workpiece 81 held above the first workpiece 71 are bonded to each other in the decompression chamber, whereby a planar layered material 91 for a display device is manufactured. The planar layered material 91 for the display device is taken out from the decompression chamber and is transferred to a next step by the first transfer device 2.

<Level Difference between Bank Portion and Filled Portion>

FIG. 3(a) is a side view illustrating a state in which the heights of the bank portion 72 and the filled portion 73 of the first workpiece 71 are the same, FIG. 3(b) is a side view illustrating a state in which the bank portion 72 is higher than the filled portion 73, and FIG. 3(c) is a side view illustrating a state in which the filled portion 73 is higher than the bank portion 72.

In the embodiment, the control devices of the linear application device 10 and the planar application device 20 are set to realize the state in which the heights of the bank portion 72 and the filled portion 73 of the first workpiece 71 are the same as illustrated in FIG. 3(a) (although setting to intentionally provide a slight level difference between the heights of the bank portion 72 and the filled portion 73 is also made in some cases).

When curing over time of the second adhesive forming the filled portion 73 is faster than curing over time of the first adhesive forming the bank portion 72, a discharged amount of the second adhesive reduces due to an increase in viscosity of the adhesive, which is caused by the curing over time. With the lapse of a manufacturing time, therefore, the planar layered material under the manufacturing comes into the state in which the bank portion 72 is higher than the filled portion 73 as illustrated in FIG. 3(b). When a relative difference in height between the bank portion 72 and the filled portion 73 exceeds an allowable range, the control device make a correction to increase the discharged amounts of the first adhesive and the second adhesive (or a correction to reduce the discharged amount of the first adhesive) such that the relative difference in height between the bank portion 72 and the filled portion 73 falls within the allowable range. Even in the case that the relative difference in height between the bank portion 72 and the filled portion 73 does not exceed the allowable range, if the actual height (absolute height) of the filled portion 73 from the surface of the first workpiece 71 is lower than the specified value beyond an allowable range, the control device makes a correction to increase the discharged amount of the second adhesive such that a difference between the actual height of the filled portion 73 and the specified value falls within the allowable range.

When the curing over time of the second adhesive forming the filled portion 73 is slower than the curing over time of the first adhesive forming the bank portion 72, the planar layered material under the manufacturing comes into the state in which the bank portion 72 is lower than the filled portion 73 as illustrated in FIG. 3(c). When the first adhesive and the second adhesive are in the above-described relation, the discharge amount of the first discharge device 11 is corrected so as to provide a larger discharge amount than in the case of FIG. 3(b). Accordingly, the height of the bank portion 72 after the correction becomes higher than that of the filled portion 73 within a range not exceeding the allowable range in some cases.

<Manufacturing Method>

A method of manufacturing the planar layered material for the display device according to the embodiment will be described below with reference to FIG. 4.

STEP 401: The first workpiece 71 is transferred by the first transfer device 2 and is placed on the worktable 15 of the linear application device 10.

STEP 402: The first adhesive is discharged to form the bank portion 72 while the first discharge device 11 and the worktable 15 are relatively moved by the relative driving device 14 (see FIG. 8).

STEP 403: The first workpiece 71 including the bank portion 72 formed thereon is transferred by the first transfer device 2 and is placed on the worktable 25 of the planar application device 20.

STEP 404: The second adhesive is discharged to form the filled portion 73 while the second discharge device 21 and the worktable 25 are relatively moved by the relative driving device 24 (see FIG. 10).

STEP 405: The first workpiece 71 including the bank portion 72 and the filled portion 73 both formed thereon is transferred to the bonding device 30 by by the first transfer device 2. Furthermore, the second workpiece 81 is transferred to the bonding device 30 by by the second transfer device 3. Here, the transfer of the second workpiece 81 by the second transfer device 3 may be performed prior to the transfer of the first workpiece 71 by the first transfer device 2.

STEP 406: The bonding device 30 bonds the second workpiece 81 to the first workpiece 71 in the decompression chamber, thereby manufacturing the planar layered material 91 for the display device.

STEP 407: The planar layered material 91 for the display device taken out from the bonding device 30 is transferred to a next step by the first transfer device 2.

STEP 408: When a predetermined period (for example, the preset number of the materials manufactured or time) has not yet arrived, a control process is shifted to STEP 401. When the predetermined period has arrived, the height adjustment step illustrated in FIG. 5 is performed.

The height adjustment step according to the embodiment will be described below with reference to FIG. 5.

STEP 501: The control device of the linear application device 10 controls the first discharge device 11 to discharge the first adhesive, thus forming a bank portion on the trial discharge stage 17. At that time, the bank portion on the trial discharge stage 17 may be formed by forming part of the shape of the bank portion to be drawn on the first workpiece 71.

STEP 502: In the linear application device 10, the height of the bank portion formed on the trial discharge stage 17 is measured by the first height measurement device 12 and is stored in the memory device of the control device. On that occasion, an image of the bank portion may be taken by the first imaging device 13 and may be stored in the memory device of the control device. Instead of executing STEP 501, the height of the bank portion 72 on the workpiece for which STEP 402 has been executed just before that timing may be measured by the first height measurement device 12 and may be stored in the memory device of the control device (see FIG. 9).

STEP 503: The control device of the planar application device 20 controls the second discharge device 21 to discharge the second adhesive, thus forming a filled portion on the trial discharge stage 27.

STEP 504: In the planar application device 20, the height of the filled portion formed on the trial discharge stage 27 is measured by the second height measurement device 22 and is stored in the memory device of the control device. On that occasion, an image of the filled portion may be taken by the second imaging device 23 and stored in the memory device of the control device. Instead of executing STEP 503, the height of the filled portion 73 on the workpiece for which STEP 404 has been executed just before that timing may be measured by the second height measurement device 22 and may be stored in the memory device of the control device (see FIG. 11).

STEP 505: Whether the height of the filled portion is within the allowable range is determined from the measured result of the height of the filled portion in STEP 504. If a difference between the measured height (absolute height) of the filled portion and the specified value of the height of the filled portion is within the allowable range, the control process is shifted to STEP 509. If the measured height of the filled portion is outside the allowable range, the control process is shifted to STEP 506. Here, satisfaction of the allowable range is checked, for example, by determining whether the height of the filled portion is within a range of ±5% of the specified value.

STEP 506: In accordance with the measured result of the height of the filled portion in STEP 504, the control device of the planar application device 20 changes setting information for adjusting the height of the filled portion 73. The adjustment of the height of the filled portion 73 is performed, for example, by changing one or more of the following parameters for performing the adjustment.
(1) Adjust a clearance between the nozzle of the second discharge device 21 and the first workpiece 71
(2) Adjust a discharge amount of the second discharge device 21 per unit time
(3) Adjust a relative moving speed between the second discharge device 21 and the worktable 25

STEP 507: The control device of the planar application device 20 controls the second discharge device 21 to discharge the second adhesive, thus forming a filled portion after the height adjustment on the trial discharge stage 27.

STEP 508: In the planar application device 20, the height of the filled portion formed on the trial discharge stage 27 is measured by the second height measurement device 22 and is stored in the memory device of the control device. The control process is shifted to STEP 505.

STEP 509: The control device of the linear application device 10 determines whether a relative difference (level difference) between the measured height of the filled portion and the measured height of the bank portion is within the allowable range. This determination is made for the reason that, if the level difference at a boundary between the filled portion 73 and the bank portion 72 is not within the allowable range, bubbles tend to generate when the first workpiece 71 and the second workpiece 81 are bonded to each other. If the calculated level difference is within the allowable range, the height adjustment step is ended. If the calculated level difference is outside the allowable range, the control process is shifted to STEP 510.

STEP 510: In accordance with the measured result of the height of the filled portion 73 in STEP 504, the control device of the linear application device 10 changes setting information for adjusting the height of the bank portion 72. The adjustment of the height of the bank portion 72 is executed by adjusting the height of the bank portion 72 to become lower (bank lowering adjustment) or by adjusting the height of the bank portion 72 to become higher (bank raising adjustment) in accordance with the setting previously set in the control device. The difference in change over time between the actually used first adhesive and second adhesive is examined in advance, and which one of the bank raising adjustment and the bank lowering adjustment is to be performed is set in the control device of the linear application device 10. The adjustment of the height of the bank portion 72 is performed, for example, by changing one or more of the following parameters for performing the adjustment.
(1) Adjust a clearance between the nozzle of the first discharge device 11 and the first workpiece 71
(2) Adjust a discharge amount of the first discharge device 11 per unit time
(3) Adjust a relative moving speed between the first discharge device 11 and the worktable 15

STEP 511: The control device of the linear application device 10 controls the first discharge device 11 to discharge the first adhesive, thus forming a bank portion after the height adjustment on the trial discharge stage 17.

STEP 512: In the linear application device 10, the height of the bank portion formed on the trial discharge stage 17 is measured by the first height measurement device 12 and is stored in the memory device of the control device. The control process is shifted to STEP 509.

The preferred embodiment of the present invention has been described above, but the technical scope of the present invention is not limited to the above embodiment. The above embodiment can be variously modified or improved, and modified or improved embodiments also fall within the technical scope of the present invention.

For example, the first discharge device 11 and/or the second discharge device 21 may be constituted by a jet type dispenser. In the jet type dispenser, a plunger not contacting or partly contacting a sidewall of a liquid chamber but not impeding flow of the liquid material is disposed in the liquid chamber in communication with a discharge port of a nozzle, and the plunger is moved forward to apply an inertial force to the liquid material, thus enabling the liquid material to be discharged in the form of a flying droplet from the discharge port.

The linear application device 10 and/or the planar application device 20 may include a UV irradiation device. In the case of using a UV curable adhesive of which shape changes in a short time after being applied, a height of the applied adhesive may be measured by the first height measurement device 12 and/or the second height measurement device 22 after curing the applied adhesive with the UV irradiation device.

The linear application device 10 and/or the planar application device 20 may include a worktable equipped with a heater. In the case of using an adhesive of which fluidity changes depending on temperature, the fluidity of the adhesive can be controlled by the heater.

Furthermore, as illustrated in FIG. 13, the bank portion forming step, the filled portion forming step, and the bonding step may be executed by one unit of planar layered material manufacturing apparatus 100 that includes a linear application section 110, a planar application section 120, and a bonding section 130.

While, in the embodiment, the heights of the filled portion 73 and the bank portion 72 are adjusted in accordance with the measured result of the height of the filled portion 73, the heights of the filled portion 73 and the bank portion 72 may be adjusted in accordance with the measured result of the height of the bank portion 72. However, the height adjustment is preferably performed on the basis of the height of the filled portion 73 as in the embodiment for the reason that, despite the height of the filled portion 73 being required to fall within the specified range, the height of the filled portion 73 may depart from the specified range when the height of the filled portion 73 is adjusted on the basis of the height of the bank portion 72, and that, when the trial discharge is repeatedly performed for the height adjustment of the filled portion 73, a larger amount of the adhesive is wasted than when the height of the bank portion 72 is adjusted.

In the height adjustment step in the embodiment illustrated, by way of example, in FIG. 5, the heights of the filled portion 73 and the bank portion 72 are adjusted by forming the filled portion after forming the bank portion. Unlike that embodiment, however, the heights of the filled portion 73 and the bank portion 72 may be adjusted by forming the bank portion after forming the filled portion. Moreover, while not only the relative height between the filled portion and the bank portion, but also the absolute height of the filled portion is adjusted in the height adjustment step in the embodiment illustrated, by way of example, in FIG. 5, either one of the relative height and the absolute height may be adjusted.

While, in the above embodiment, the relative difference in height (the above-described level difference) is adjusted by forming the filled portion or the bank portion on the trial discharge stage and by measuring the height of the filled portion or the bank portion, the case of adjusting the above-described level difference without using the trial discharge stage also falls within the scope of the present invention. More specifically, the above-described level difference may be adjusted by placing a dummy workpiece (not illustrated) on the worktable 15, forming, on the dummy workpiece, the filled portion or the bank portion that is similar to be drawn and formed on an actual workpiece, and by measuring the height of the filled portion or the bank portion (namely, the provision of the trial discharge stage is not essential).

In addition, the present invention can be incorporated into a manufacturing process for an actual product. For example, it is also possible to measure the height of the bank portion formed on a workpiece for the actual product, and to, in accordance with a result of the measurement, adjust the height of the filled portion that is formed in the subsequent filled portion forming step. More specifically, the relative height between the filled portion and the bank portion of the actual product can be adjusted without stopping the manufacturing process by adjusting, on the basis of the height of the bank portion formed on the actual workpiece, (1) the clearance between the nozzle of the second discharge device and the workpiece, (2) the discharge amount of the second discharge device per unit time, or (3) the relative moving speed between the second discharge device and the worktable. As a matter of course, it is further possible to measure the height of the filled portion formed on the actual workpiece, and to, in accordance with a result of the measurement, adjust the height of the bank portion that is formed in the subsequent bank portion forming step. More specifically, the relative height between the filled portion and the bank portion of the actual product can also be adjusted without stopping the manufacturing process by adjusting, on the basis of the height of the filled portion formed on the actual workpiece, (1) the clearance between the nozzle of the first discharge device and the workpiece, (2) the discharge amount of the first discharge device per unit time, and (3) the relative moving speed between the first discharge device and the worktable.

LIST OF REFERENCE SIGNS

1 manufacturing line of planar layered material for display device
2 first transfer device
3 second transfer device
10 linear application device
11 first discharge device
12 first height measurement device
13 first imaging device
14 relative driving device
15 worktable
16 base
17 trial discharge stage
20 planar application device
21 second discharge device
22 second height measurement device
23 second imaging device
24 relative driving device
25 worktable
26 base
27 trial discharge stage
30 bonding device
71 first workpiece (lower workpiece)
72 bank portion
73 filled portion
81 second workpiece (upper workpiece)
82 robot hand
91 planar layered material for display device
100 planar layered material manufacturing apparatus

The invention claimed is:

1. A planar layered material manufacturing method for continuously manufacturing a planar layered material by repeatedly performing:
   a bank portion forming step of supplying a first liquid material to a first workpiece from a first nozzle and forming a bank portion in a frame shape;
   a filled portion forming step of performing planar application of a second liquid material from a second nozzle and forming a filled portion; and
   a bonding step of bonding the first workpiece including the bank portion and the filled portion formed on an inner side of the bank portion and a second workpiece to each other,
   the planar layered material manufacturing method comprising:
   a height measurement step of measuring, by a height measure, a height of a formed filled portion or bnk portion; and
   a height adjustment step of adjusting a relative height between the filled portion and the bank portion on the basis of the height of the filled portion or the bank portion measured in the height measurement step,
   wherein when a predetermined period has arrived, the height measurement step and the height adjustment step are performed such that until the predetermined period has arrived, a planar layered material is manufactured repeatedly under the same condition wherein the predetermined period is at least the manufacture of two planar layered materials.

2. The planar layered material manufacturing method according to claim 1, wherein, when the height of the bank portion is measured in the height measurement step, at least the height of the filled portion is adjusted in the height adjustment step, and when the height of the filled portion is measured in the height measurement step, at least the height of the bank portion is adjusted in the height adjustment step.

3. The planar layered material manufacturing method according to claim 1, wherein the height of the bank portion to be formed in the next bank portion forming step or the height of the filled portion to be formed in a next filled portion forming step is adjusted in the height adjustment step on the basis of the height of the filled portion or the bank portion measured in the height measurement step such that a relative difference between the height of the filled portion and the height of the bank portion falls within a preset range.

4. The planar layered material manufacturing method according to claim 1, wherein linear application is performed in the bank portion forming step, and the height of the bank portion to be formed in a next bank portion forming step is adjusted in the height adjustment step.

5. The planar layered material manufacturing method according to claim 4, wherein the height of the bank portion to be formed in a next bank portion forming step is adjusted in the height adjustment step by adjusting a clearance between the first nozzle and the first workpiece.

6. The planar layered material manufacturing method according to claim 4, wherein the height of the bank portion to be formed in a next bank portion forming step is adjusted in the height adjustment step while a supply amount of the first liquid material is kept constant.

7. The planar layered material manufacturing method according to claim 4, wherein the height of the bank portion to be formed in a next bank portion forming step is adjusted in the height adjustment step by adjusting a supply amount of the first liquid material.

8. The planar layered material manufacturing method according to claim 4, wherein the height of the bank portion to be formed in a next bank portion forming step is adjusted in the height adjustment step by adjusting a relative moving speed between the first nozzle and the first workpiece.

9. The planar layered material manufacturing method according to claim 4, wherein the height of the bank portion to be formed in a next bank portion forming step is adjusted in the height adjustment step while a relative moving speed between the first nozzle and the first workpiece is kept constant.

10. The planar layered material manufacturing method according to claim 4, wherein, when the height of the filled portion measured in the height measurement step is outside an allowable range, the height of the filled portion to be formed in a next filled portion forming step is further adjusted in the height adjustment step.

11. The planar layered material manufacturing method according to claim 1, wherein the height of the filled portion to be formed in a next filled portion forming step is adjusted in the height adjustment step.

12. The planar layered material manufacturing method according to claim 11, wherein the height of the filled portion to be formed in next filled portion forming step is adjusted in the height adjustment step by adjusting a clearance between the second nozzle and the first workpiece.

13. The planar layered material manufacturing method according to claim 11, wherein the height of the filled portion to be formed in a next filled portion forming step is adjusted in the height adjustment step while a supply amount of the second liquid material is kept constant.

14. The planar layered material manufacturing method according to claim 11, wherein the height of the filled portion to be formed in a next filled portion forming step is adjusted in the height adjustment step by adjusting a supply amount of the second liquid material.

15. The planar layered material manufacturing method according to claim 11, wherein the height of the filled portion to be formed in a next filled portion forming step is adjusted in the height adjustment step by adjusting a relative moving speed between the second nozzle and the first workpiece.

16. The planar layered material manufacturing method according to claim 11, wherein the height of the filled portion to be formed in a next filled portion forming step is adjusted in the height adjustment step while a relative moving speed between the second nozzle and the first workpiece is kept constant.

17. The planar layered material manufacturing method according to claim 1, wherein the height of the filled portion formed on a first workpiece on which a filled portion forming step has been performed is measured in the height measurement step.

18. The planar layered material manufacturing method according to claim 17, wherein the height in an edge region along a side of the filled portion formed on the first workpiece is measured in the height measurement step at plural locations by the height measure.

19. The planar layered material manufacturing method according to claim 1, wherein the height of the bank portion formed on a first workpiece on which a bank portion forming step has been performed is measured in the height measurement step.

20. The planar layered material manufacturing method according to claim 19, wherein the height in a central region of a side or a corner region of the bank portion formed on the first workpiece is measured in the height measurement step at plural locations by the height measure.

21. The planar layered material manufacturing method according to claim 1, wherein the height of the filled portion or the bank portion formed on a trial discharge stage is measured in the height measurement step.

22. The planar layered material manufacturing method according to claim 1, wherein the height adjustment step is executed per preset period.

23. The planar layered material manufacturing method according to claim 1, wherein the planar layered material is a planar layered material for a display device.

24. The planar layered material manufacturing method according to claim 1, wherein the second nozzle is a slit nozzle.

25. A planar layered material manufacturing apparatus for executing the planar layered material manufacturing method according to claim 1, the planar layered material manufacturing apparatus comprising:
a linear application device including a first discharge device to execute the bank portion forming step;
a planar application device including a second discharge device to execute the filled portion forming step;
a bonder executing the bonding step; and
a height measure and a control device executing the height adjustment step when the predetermined period has arrived.

26. The planar layered material manufacturing apparatus according to claim 25, wherein the height measure is constituted by a first height measure included in the linear application device and a second height measure included in the planar application device, the linear application device and the planar application device are able to communicate with each other via a network, and the linear application device adjusts the height of the bank portion in accordance with information about the height of the filled portion measured by the second height measure, the information being received from the planar application device.

27. The planar layered material manufacturing apparatus according to claim 25, wherein the linear application device has a bank raising adjustment function of adjusting the height of the bank portion to be raised in accordance with information about the height of the filled portion, and a bank lowering adjustment function of adjusting the height of the bank portion to be lowered in accordance with the information about the height of the filled portion.

* * * * *